Patented Apr. 14, 1925.

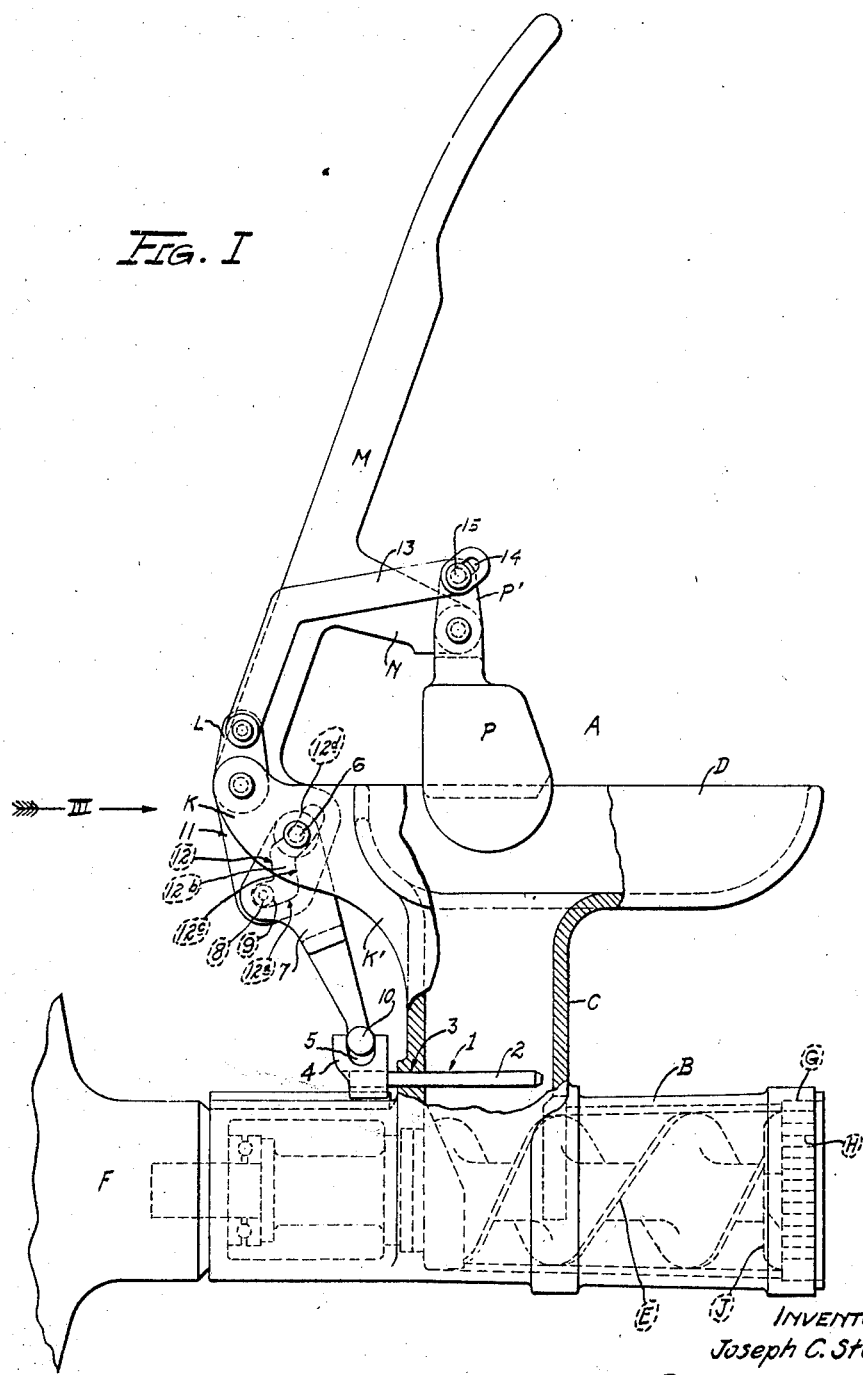

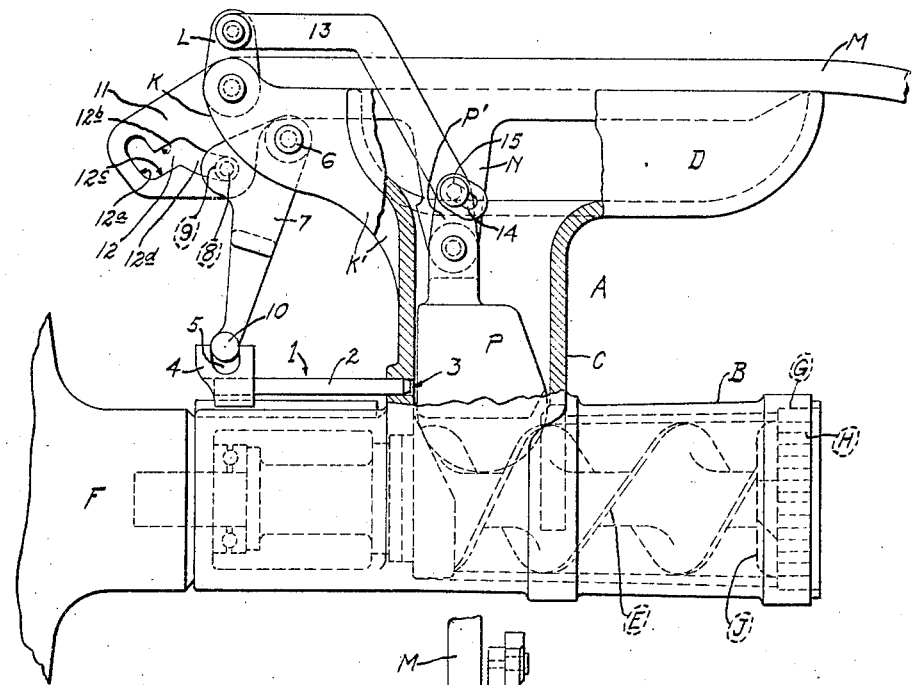
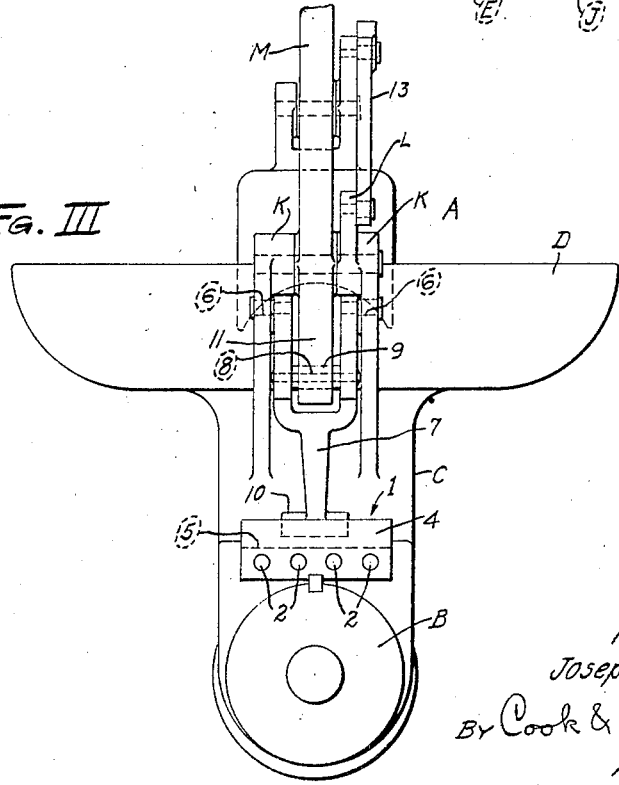

1,533,217

UNITED STATES PATENT OFFICE.

JOSEPH C. STEINER, OF ST. LOUIS, MISSOURI.

SAFETY DEVICE FOR FOOD CHOPPERS.

Application filed March 14, 1924. Serial No. 699,237.

*To all whom it may concern:*

Be it known that I, JOSEPH C. STEINER, a citizen of the United States of America, a resident of the city of St. Louis, in the State of Missouri, have invented certain new and useful Improvements in Safety Devices for Food Choppers, of which the following is a full, clear, and exact description, reference being had to the accompanying drawings, forming a part of this specification.

This invention relates generally to food choppers, and particularly to a safety device which is intended to be associated with a food chopper whereby the hands of the person operating said food chopper are protected from injury when the food to be chopped is being introduced into said food chopper. My improved safety device is particularly intended for use with a food chopper of the type having a worm feed which forces the food through apertures in a disk, whereby said food is disintegrated.

As is well known, food choppers of the type suggested above in a great number of cases are power driven, and because of this fact serious accidents have occurred due to the operator's fingers being caught in the feed worm of the machine. The danger that the operator's fingers may be caught in the worm of the machine has been reduced somewhat in late years by the adoption of a lever feed which was intended to discourage and prevent the use of the fingers in feeding the meat or other matter through the chopper, but even this lever feed did not entirely eliminate the practice of forcing the meat or other matter into the chopper with the fingers. It was found that the operators in their desire for speed of operation would poke the meat down into the neck of the machine with their fingers, even while they were using the lever feed, and this practice resulted in injury to their fingers.

The main purpose of the present invention is to provide means whereby the fingers of the operator of a food chopper provided with a lever feed are prevented from coming into contact with the feed worm of said food chopper when said food chopper is in operation, and briefly described the invention comprises a movable guard which is capable of being moved to a position where it is located adjacent to said feed worm to prevent access thereto. The movable guard mentioned is cooperatively connected to the lever feed of the machine in such manner that when the plunger which is associated with said lever feed is in a lowered position the movable guard is withdrawn from its position adjacent to the feed worm, but when said plunger is in a raised position so that the operator may insert his fingers into the machine said guard is in a position adjacent to the feed worm, thus preventing the fingers of the operator from being moved into contact with said feed worm.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a side elevation of a food chopper provided with my improved safety device.

Fig. II is a view similar to Fig. I, showing the feeding mechanism and the safety device in a moved position.

Fig. III is a rear elevation looking in the direction indicated by the feathered arrow in Fig. I, a portion of the lever of the feeding mechanism beng broken away.

In the drawings, A designates a food chopping machine which comprises a housing having a grinding or chopping compartment B, a neck portion C and a food-receiving hopper portion D. The housing illustrated in the drawing is the usual housing which forms a part of a chopping machine of the type disclosed herein, and for that reason it will not be necessary to describe same in detail. Arranged in the grinding compartment B of the housing is a worm E, said worm being supported in suitable bearings so that it may rotate within said compartment. The worm E is connected to any suitable driving means, such as an electric motor, a portion of which is designated by the reference character F in Figs. I and II. Located at the discharge end of the grinding compartment B of the housing of the machine is a disk G provided with a plurality of apertures H, and interposed between said disk G and an end of the worm E is a cutting device J. In the use of the machine briefly described the meat or other food to be chopped is placed in the hopper D and is fed from there into and through the neck portion C of the housing. The matter being chopped passes from the neck portion C of the housing into the grinding compartment B of the housing, wherein said matter is forced toward the discharge end of said compartment B by the worm E. The matter being chopped is then forced through the apertures H in the disk G whereby said matter is divided into a plurality of individual bodies, each of which is periodically severed by the cutting device J which rotates with the worm E. The foregoing is a very brief description of the chopping machine and its operation, but as this machine and its operation are well known it is not believed to be necessary to describe the same further.

Referring now to the mechanism for feeding the meat or other matter into the chopping machine. The hopper D of the housing is provided with a pair of ears K which are separated slightly from each other, as shown in Fig. III, one of said ears being provided with an upwardly extended portion as designated by the reference character L. The ears K are provided with integral webs K' which are merged into the neck portion C of the housing of the machine, said webs being intended to give sufficient strength to the ears to enable them to withstand the usage to which they are subjected. Hingedly secured to the ears K is a lever M provided with a laterally extending portion N. The lever M is capable of being swung to a position where it is parallel with and rests upon the upper edge of the hopper D of the housing of the machine, in which position the extension N will extend downwardly into the neck portion C of said housing, as shown in Fig. II. Pivotally secured to the extension N is a plunger P, said plunger being substantially the same diameter as the interior of the neck portion C of the machine housing. The plunger P is provided with an upwardly extending portion P', which is intended for a purpose to be hereinafter set forth.

In the use of the feeding mechanism just described, the meat or other food matter to be chopped is placed in the hopper D and in the upper portion of the neck portion C of the housing A. The lever M is then drawn downwardly so as to cause the plunger P to move downwardly in the neck portion of the housing, and because the plunger is approximately the same diameter as the inside of the neck portion of the housing, all of the meat therein will be forced downwardly into the grinding compartment of the machine.

As already suggested, it has been found that operators of chopping machine such as the one described herein have made a practice of poking the meat or other matter downwardly into the neck portion C of the machine housing with their fingers, and this was done in spite of the fact that the machines were provided with lever feeds. The operator's usual method of operation was to grasp the lever M with one hand and to feed the meet or other matter into the neck portion of the housing with the other hand, and this feeding of the meat by hand was continued even while the lever M was being drawn downwardly; that is, the operator would continue to feed the meat into the neck of the machine by hand until the lever M had been moved downwardly a sufficient distance to make it impossible for the operator to get his fingers between the lower face of the plunger P and the top face of the lower wall of the hopper D. Thus it is apparent that there was always danger that the operator's fingers might be brought into contact with the worm E of the machine. The main purpose of the present invention is to eliminate the danger mentioned above, and the mechanism by which this purpose may be accomplished will now be described.

1 designates a safety gate which is arranged immediately above the worm E, said gate preferably comprising a plurality of rods 2 which pass through apertures 3 in the wall of the neck portion C of the housing at the lower end of said neck portion, there being an aperture for each rod and said apertures being approximately the same shape and diameter as said rods. Fixed to the rear ends of the rods 2 is a connecting member 4, said connecting member being provided with a groove 5 which extends longitudinally of the connecting member 4. Pivotally secured to the ears K at the points indicated by the reference character 6 is a bifurcated member 7, said bifurcated member being provided with a pin 8 which extends transversely of said member 7 from one leg of the bifurcated portion to the other leg thereof. Mounted on the pin 8 is an anti-friction roller 9. The lower end of the bifurcated member 7 is provided with a horizontal member 10 which extends into the groove 5 in the connecting member 4, as shown clearly in Figs. I and II.

The lower end of the lever M is provided with an enlarged portion 11, which is provided with a cam slot 12, and said enlarged portion 11 is so arranged with respect to the bifurcated member 7 that the pin 8 and the anti-friction roller 9 associated with said bifurcated member extend through and operate in said cam slot 12.

13 designates a link, one end of which is pivotally attached to the portion L of one of the ears K, and the other end of which is attached to the upwardly extending portion P' of the plunger P. The end of the link 13 which is attached to the portion P' of the plunger is provided with a slot 14 through which a pin 15 carried by the portion P' passes.

The operation of my improved safety device is as follows:

Assume that the parts of the machine are in the positions in which they are shown in Fig. I and that the operator is about to introduce meat or other food matter into the machine. It will be noted that the gate 1 extends across the opening in the neck portion C of the housing A at a point immediately above the worm E, and because the rods 2 are in close proximity to each other, as shown in Fig III, it is apparent that it would be impossible for the operator's fingers to come into contact with said worm, even though said operator poked the matter to be ground down into the neck portion C of the housing with his fingers. Assume that the operator has placed an amount of meat below the plunger P and has started to move the lever M downwardly to force said meat into the grinding compartment of the machine. When the lever M is drawn downwardly the enlarged portion 11 of said lever, together with the slot 12, will of course move rearwardly. The rearmost portion of the cam slot 12 comprises a dwell 12$^a$. In other words, it is concentric with the center about which the portion 11 pivots, and for that reason the pin 8 and roller 9 will pass idly through said portion 12$^a$. The intermediate portion 12$^b$ of the cam slot 12, however, is an active portion of said cam slot, and when the wall 12$^c$ of said portion 12$^b$ contacts with the roller 9 the bifurcated member 7 will be swung on its pivot so that the lowermost portion of said member 7 will be moved rearwardly. This will draw the gate 1 outwardly to the position in which it is shown in Fig. II, whereby the meat and plunger P may move downwardly in the neck portion C of the machine without interference from the gate 1. After the roller 9 has passed through the intermediate portion 12$^b$ of the cam slot 12 the roller 9 enters a second dwell 12$^d$, which will permit the lever M to continue its downward movement without affecting the gate 1.

It is thus seen that the gate 1 is in position adjacent to the worm E of the machine when the lever is in its uppermost position. It is also apparent that during the initial movement of the lever M downwardly the gate remains in its original position, for during this initial movement is may be possible for the operator to insert his fingers into the machine. However, after the lever has been moved to such position that the plunger P prevents the operator from inserting his fingers into the machine, the gate is immediately and quickly withdrawn from the neck portion of the housing, thus permitting the free passage of meat through said neck portion, and because of the dwell 12$^d$ in the cam slot 12 the gate remains in its outward position during the final downward movement of the lever M. During the upward movement of the lever M the gate remains in its outward position until the lever has been moved to a position where it would be possible for the operator to insert his fingers into the machine, when said gate is immediately moved to the position where it prevents access to the worm E.

The purpose of the link 13 is to prevent the plunger P from being moved by the operator so that he may insert his fingers into the machine, the movement of said plunger being limited to the length of the slot 14.

I claim:

1. A safety device for a food-grinding machine having grinding mechanism, comprising a slidable guard adapted to be moved to a position adjacent to said grinding mechanism to prevent the hands of the operator from coming into contact with said grinding mechanism.

2. A safety device for a food-grinding machine having grinding mechanism comprising a guard, said guard being capable of being automatically moved into and out of position adjacent to said grinding mechanism.

3. A safety device for a food-grinding machine having a worm for feeding the food to be ground, comprising a guard, said guard being movable into and out of position adjacent to said worm.

4. A safety device for a food-grinding machine having a worm for feeding the food to be ground, comprising a guard, said guard comprising a plurality of rods and being movable into and out of position adjacent to said worm.

5. A safety device for a food-grinding machine having a lever for feeding the food into the machine and a worm within said machine, comprising a guard movable into and out of position adjacent to said worm, and means whereby said guard is cooperatively connected to said lever.

6. A safety device for a food-grinding machine having a lever for feeding the food into the machine and a worm within said machine, comprising a guard which includes a plurality of rods, said guard being movable into and out of position adjacent to said worm, and means whereby said guard is cooperatively connected to said lever.

7. A food-grinding machine comprising a housing, a worm within said housing, a lever for feeding food to be ground into said housing, a guard movable into and out of position adjacent to said worm, and a member cooperatively connected to said guard and said lever whereby the movement of said lever may be transmitted to said guard.

8. A food-grinding machine comprising a housing, a worm within said housing, a lever for feeding food to be ground into said housing, a guard movable into and out of position adjacent to said worm, and a pivoted member cooperatively connected to said guard and said lever whereby movement of said lever may be transmitted to said guard.

9. A food-grinding machine comprising a housing, a worm within said housing, a lever for feeding food to be ground into said housing, a guard movable into and out of position adjacent to said worm, and a pivoted member cooperatively connected to said guard and said lever, said lever being provided with a cam face adapted to engage a portion of said pivoted member whereby movement of said lever may be transmitted to said guard.

10. A food-grinding machine comprising a housing, a worm within said housing, a lever for feeding food to be ground into said housing, a guard movable into and out of position adjacent to said worm, and a pivoted member cooperatively connected to said guard and said lever, said lever being provided with a cam slot and said pivoted member being provided with an element adapted to operate in said cam slot whereby movement of said lever may be transmitted to said guard.

11. A food-grinding machine comprising a housing, a worm within said housing, a lever for feeding food to be ground into said housing, a guard movable into and out of position adjacent to said worm, and a pivoted member cooperatively connected to said guard and said lever, said lever being provided with a cam slot having a dwell and said pivoted member being provided with an element adapted to operate in said cam slot whereby a portion of the movement of said lever will be transmitted to said guard.

12. A food-grinding machine comprising a housing, a worm within said housing, a lever for feeding food to be ground into said housing, a guard movable into and out of position adjacent to said worm, and a pivoted member cooperatively connected to said guard and said lever, said lever being provided with a cam slot having a dwell at each of its ends, and said pivoted lever being provided with an element adapted to operate in said cam slot whereby that portion of the movement of the lever intermediate of the initial movement and the final movement thereof may be transmitted to said guard.

13. A food-grinding machine comprising a housing, a worm within said housing, a feeding lever pivoted to said housing, a plunger pivoted to said feeding lever, a link associated with said plunger whereby the pivoted movement thereof is limited, a guard movable into and out of position adjacent to said worm, and a member cooperatively connected to said guard and said feeding lever whereby movement of said feeding lever may be transmitted to said guard.

In testimony that I claim the foregoing I hereunto affix my signature.

JOSEPH C. STEINER.